(12) United States Patent
Benjelloun Mlayah et al.

(10) Patent No.: US 9,580,588 B2
(45) Date of Patent: Feb. 28, 2017

(54) USE OF A LIGNIN FOR THE MECHANICAL REINFORCEMENT OF AN ELASTOMER, AND ELASTOMER THUS REINFORCED

(71) Applicant: COMPAGNIE INDUSTRIELLE DE LA MATIERE VEGETALE, Neuilly-sur-Seine (FR)

(72) Inventors: Bouchra Benjelloun Mlayah, Pompertuzat (FR); Michel Delmas, Auzeville-Tolosane (FR)

(73) Assignee: COMPAGNIE INDUSTRIELLE DE LA MATIERE VEGETALE, Neuilly sur Seine (FR)

( * ) Notice: Subject to any disclaimer, the term of this patent is extended or adjusted under 35 U.S.C. 154(b) by 0 days.

(21) Appl. No.: 14/414,344

(22) PCT Filed: Jul. 16, 2013

(86) PCT No.: PCT/EP2013/064992
§ 371 (c)(1),
(2) Date: Jan. 12, 2015

(87) PCT Pub. No.: WO2014/012924
PCT Pub. Date: Jan. 23, 2014

(65) Prior Publication Data
US 2015/0152255 A1    Jun. 4, 2015

(30) Foreign Application Priority Data

Jul. 17, 2012   (FR) ...................................... 12 56889

(51) Int. Cl.
*C08L 23/16* (2006.01)
*C08H 7/00* (2011.01)
*C08L 97/00* (2006.01)

(52) U.S. Cl.
CPC ................. *C08L 23/16* (2013.01); *C08H 6/00* (2013.01); *C08L 97/005* (2013.01)

(58) Field of Classification Search
CPC .............................. C08L 23/16; C08L 97/005
See application file for complete search history.

(56) References Cited

U.S. PATENT DOCUMENTS

| | | | |
|---|---|---|---|
| 3,223,697 A * | 12/1965 | Ball ........................ | C08H 6/00 417/174 |
| 3,699,091 A | 10/1972 | Dimitri | |
| 3,699,093 A | 10/1972 | Dimitri | |
| 3,808,192 A * | 4/1974 | Dimitri .................... | C08H 6/00 530/500 |
| 3,984,362 A | 10/1976 | Sirianni et al. | |
| 4,764,596 A * | 8/1988 | Lora ..................... | C07D 307/50 162/16 |

FOREIGN PATENT DOCUMENTS

| | | |
|---|---|---|
| EP | 1 180 171 B1 | 10/2003 |
| EP | 2 223 928 A1 | 9/2010 |

OTHER PUBLICATIONS

C.H. Giles and S.N. Nakhwa: "Studies in adsorption. XVI. The measurement of specific surface areas of finely divided solids by solution asdorption". Journal of Applied Chemistry, Jun. 1962 (Jun. 1962). pp. 266-273, XP002696653, Glasgow From p. 266. last three lines to p. 267. end of the second paragraph.
International Search Report, dated Sep. 16, 2013, from corresponding PCT application.
FR Search Report, dated May 7, 2013, from from corresponding FR application.

* cited by examiner

*Primary Examiner* — Robert Harlan
(74) *Attorney, Agent, or Firm* — Young & Thompson

(57) ABSTRACT

A method for the mechanical reinforcement of elastomer polymers, of a chemically unmodified lignin with available functional groups which has a specific surface area of between 0.5 m$^2$/g and 5 m$^2$/g, and preferably between 1 m$^2$/g and 2.5 m$^2$/g. Also an elastomer thus reinforced, in particular without carbon black.

16 Claims, 3 Drawing Sheets

EPDM/CARBON BLACK: X250

EPDM/Biolignin 40%: X250

EPDM/Biolignin 60%: X250

EPDM/Biolignin 100%: X250

US 9,580,588 B2

USE OF A LIGNIN FOR THE MECHANICAL REINFORCEMENT OF AN ELASTOMER, AND ELASTOMER THUS REINFORCED

TECHNICAL FIELD OF THE INVENTION

The present invention relates to a novel use of a pure and non-degraded biopolymer of natural polyphenol type represented by a specific lignin—hereinafter lignin—for mechanical reinforcement in polymeric elastomer structures.

The present invention also relates to an elastomer prepared by implementing the use in accordance with the invention.

The novel use according to the present invention lies in the employment of a particular lignin derived from a vegetable raw material, in particular from wheat straw, and which is composed of low-molecular-weight linear oligomers which behave like homologous phenolic oligomers and polymers.

The novel use of the present invention has been made possible because the pure and non-degraded lignin (hereinafter called "Biolignin™" or else "CIMV lignin") is prepared by means of a process—hereinafter the "CIMV process"—which is perfectly controlled and which is described in particular in patent document EP-B1-1.180.171.

The notion of purity and the native nature of the "Biolignin™" can in particular be summarized by the following points: residual polysaccharide content, mineral matter content, average molecular weight and distribution, reactive function (in particular hydroxyl) content, all these characteristics being obtained without specific treatment.

Characterization studies carried out, in particular, by Michel Delmas and Bouchra Mlayah Benjelloun, have in addition made it possible to establish the structure and the functionality of CIMV lignin thus prepared, the results of the studies of which have been published in the following documents:

A "Functionality of wheat Straw Lignin Extracted in Organic Acid Media Journal of Applied Polymer Science" in Vol. 121 491-501 (2011);

B "Structural elucidation of the wheat straw lignin polymer . . ." in JOURNAL OF THE MASS SPECTROMETRY 2003; 38: 900-903;

C "Elucidation of the complex molecular structure of wheat straw lignin polymer . . ." in RAPID COMMUNICATIONS IN MASS SPECTROMETRY 2007; 21: 2867-2888.

In particular, a certain functionality and/or specific physicochemical properties of this Biolignin™ or CIMV lignin demonstrated during these studies have confirmed the potential of this lignin in commercial applications in the manufacture of nontoxic polymers, in particular in the field of adhesives for particle boards, laminated boards, plywood boards and/or in green plastics technology, in particular phenolic resins or epoxy resins.

More surprisingly, the specific physicochemical properties of this lignin have confirmed the potential of this lignin as an excellent carbon black substitute for mechanical reinforcement in polymeric elastomer structures.

It is the latter discovery which forms the basis of the present invention.

STATE OF THE ART

The use of a lignin as a replacement for carbon black as a reinforcing element in the production of elastomer compounds is known from the document "Lignin for Reinforcing Rubber" (J. J. KLEIN AND ARTHUR POLLACK—West Virginia Pulp and Paper Company, Charleston—published more than 60 years ago in "INDUSTRIAL AND ENGINEERING CHEMISTRY Vol. 39, No. 4".

In addition to the fact that the structure of lignin described in said document is not defined, its physicochemical properties, for example in terms of specific surface area, and its functionality are fundamentally different than those of the lignin which is prepared and non-degraded in accordance with the use according to the invention.

More recent patent documents, for example EP-A1-2.223.928, relate to the use of a "functionalized" lignin and all refer to chemically modified lignin in rubber-based compositions.

In document U.S. Pat. No. 3,223,697, for use as a reinforcing element in a rubber composition (column 2, line 31 et seq.), reference is made to lignins obtained by coprecipitation, i.e. chemically modified lignins. Furthermore, it is indicated that the results obtained after reduction to powder were not satisfactory. Thus, despite the efforts to increase the specific surface area and to reduce the particle size, the replacement of carbon black with lignin was not satisfactory.

Next, (column 3, line 5 et seq.), said document indicates an attempt to reduce the particle diameter so as to obtain a specific surface area of between 3 and 5 $m^2/g$. Firstly, this modification was not satisfactory from the point of view of the results obtained, and, secondly, it still comes under attempts to use chemically modified lignins. Next, as regards the invention which is the subject matter of said document, starting from column 3, line 17 et seq., reference is made to a process for heating and chemically modifying lignin with a view to obtaining powdered lignin having a specific surface area of at least 20 $m^2/g$.

Document U.S. Pat. No. 3,984,362 relates to chemically modified lignin and in particular to examples 1 and 2 (see in particular the products added for the preparation of powdered lignin). Said document first claims a preparation of lignin, by washing and reprecipitation at acidic pH before its use as a mixture with rubber, i.e. a preparation before use.

The lignin in accordance with the use according to the invention differs therefrom in that it is not chemically modified and in that its functional groups are "available".

SUMMARY OF THE INVENTION

A subject of the present invention is a use, for the mechanical reinforcement of elastomer polymers, of a chemically unmodified lignin with available functional groups which has a specific surface area of between 0.5 $m^2/g$ and 5 $m^2/g$, and preferably between 1 $m^2/g$ and 2.5 $m^2/g$.

According to other characteristics of the invention:
said lignin has a low molecular weight and the Mw of which is between 700 g/mol and 2000 g/mol;
said lignin has a polydispersity index equal to approximately 1.3;
said lignin comprises available functional groups chosen from the group made up of aliphatic hydroxyls, phenolic hydroxyls and carboxylic acids;
the aliphatic hydroxyls are present at from 1.5 mmol/g to 3.0 mmol/g, preferably at 2.3 mmol/g;
the phenolic hydroxyls are present at from 1.1 mmol/g to 2.0 mmol/g, preferably in a content not less than 1.1 mmol/g;
the carboxylic acids are present at from 0.5 mmol/g to 1.5 mmol/g, preferably in a content equal to approximately 1.0 mmol/g;

said lignin has a weighted average particle diameter of between 5 microns and 100 microns, and preferably between 10 microns and 15 microns. A subject of the invention is also an elastomer.

The invention also provides an elastomer which incorporates a lignin employed in a use according to the teachings of the invention.

According to another characteristic, the elastomer does not comprise carbon black.

BRIEF DESCRIPTION OF THE FIGURES

The present invention will now be described by means of implementation examples and tables of results given purely by way of nonlimiting illustration, and with reference to the attached drawings in which.

DETAILED DESCRIPTION OF THE INVENTION

A lignin powder was prepared as follows from a Biolignin™ obtained according to the CIMV process:

"Fine" milling was carried out, by means of a ball and planetary mill, using a wheat straw Biolignin™, which has the following characteristics:

Dry matter: 95%

Specific surface area: 1.56 m$^2$/g

Particle size distribution: 50% of the particles have a weighted average particle diameter of less than 15 microns and 90% of the particles have a weighted average particle diameter of less than 100 microns.

Figure 1:
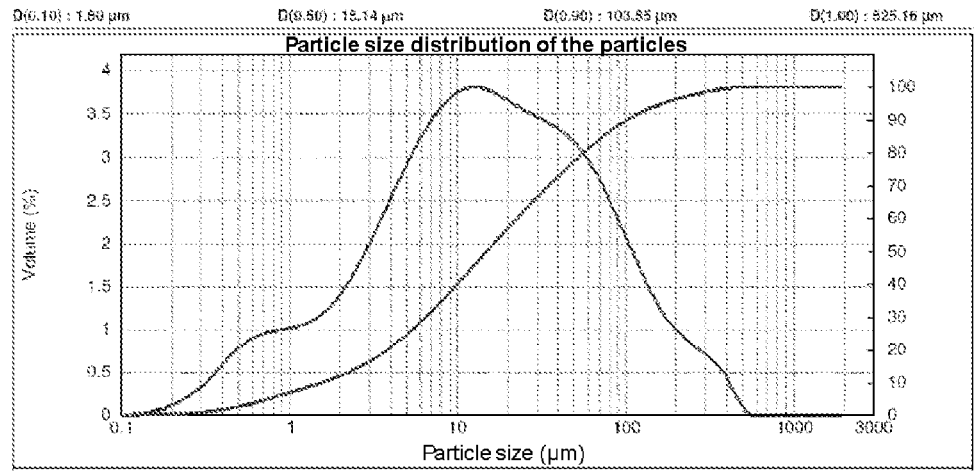
FIG. 1 is a graph illustrating the particle size division/distribution of the particles of a "standard" 500 micron Biolignin™.

The particle size distribution of the particles is illustrated in FIG. 1 of the drawings appended to the present description.

Figure 2:
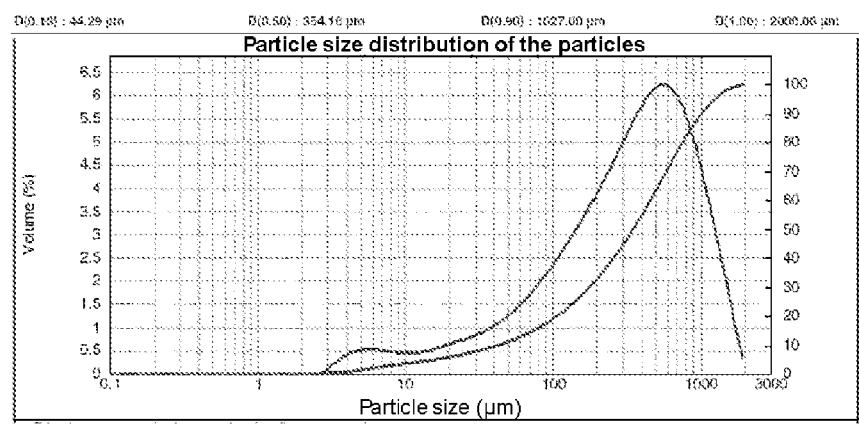
FIG. 2 is a graph illustrating the particle size division/distribution of the particles of a finely ground 15 micron Biolignin™.
Figure 3:
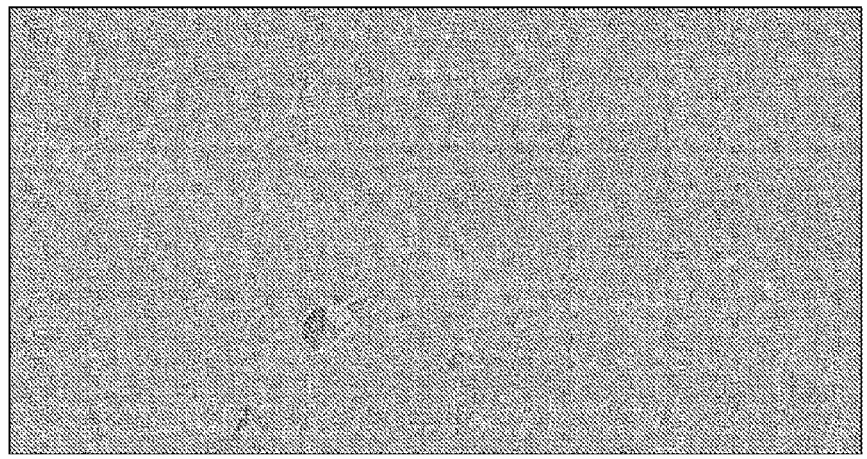
FIGS. 3 to 6 are microscopy views produced by scanning electron microscopy of various mixtures according to the invention and/or reference products.
Figure 4:
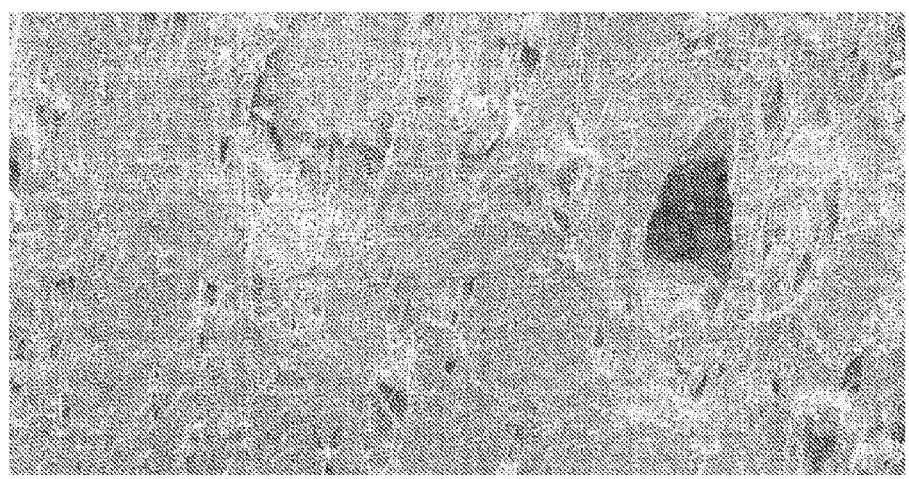
Figure 5:
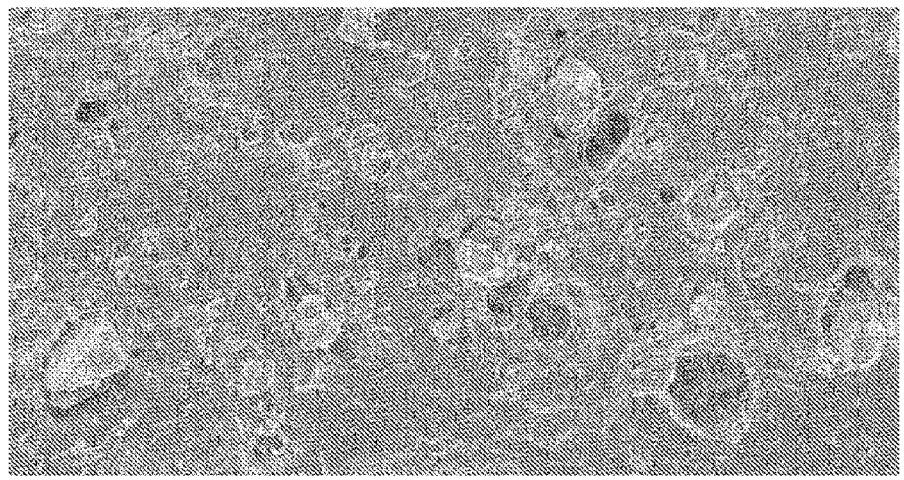
Figure 6:
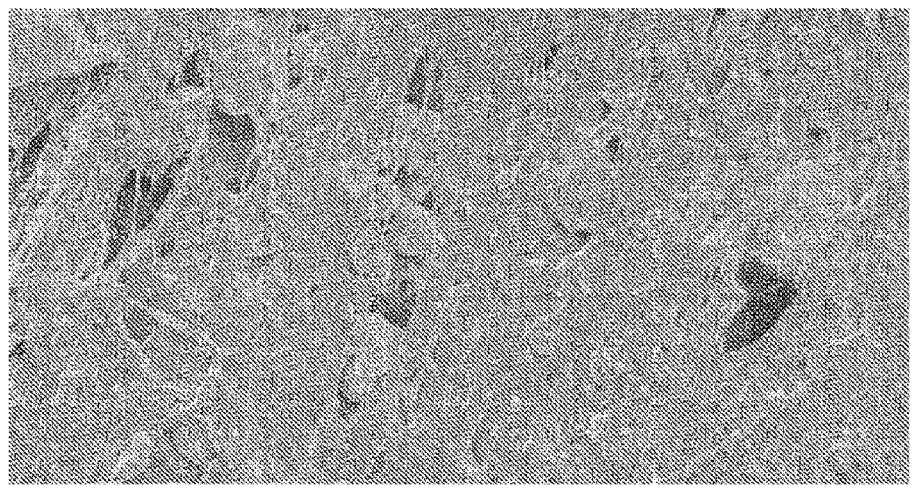

Represented in FIG. 2 is, in addition, the particle size distribution of the particles of a "standard" Biolignin™ which has the following characteristics:

Dry matter: 95%

Specific surface area: 0.077 m$^2$/g

Particle size distribution: 40% of the particles have a weighted average particle diameter of between 350 microns and 1000 microns and 90% of the particles have a weighted average particle diameter of between 45 microns and 1000 microns.

Tests for dispersion of the Biolignin™ in an elastomer, and more particularly in an EPDM (ethylene-propylene-diene monomer) which is used in all the fields of the rubber industry, were carried out.

The lignin powder was incorporated directly into a rubber by means of a roll mixer system.

The results of these tests were compared with a reference mixture composed of carbon black and of EPDM.

The microscopic state of these mixtures by dispersion was evaluated by scanning electron microscopy (MEB) and the results are shown in FIGS. 3 to 6 which are microscopic views, with a 250-times magnification.

It is noted that, whatever the level of incorporation of the Biolignin™ into the EPDM, heterogeneity of the mixture is observed in all cases.

Comparative tests were carried out with three samples of EPDM/Biolignin™ mixtures and an EPDM/carbon black reference sample, the results of which are the following.

TABLE 1

"Standard" 500 micron Biolignin™
500 micron Biolignin™

|  |  |  |  |  |
|---|---|---|---|---|
| Weight proportion of EPDM | 100 | 100 | 100 | 100 |
| Weight proportion of Biolignin |  | 35 | 72 | 105 |
| Weight proportion of carbon black | 100 | 0 | 0 | 0 |
| Density g/cm$^3$ | 1.18 |  | 1.06 | 1.15 |
| shA hardness | 69 | 55 | 68 | OOS |
| Elongation at break Eb mm | 270 | 240 | 165 | 100 |
| Compression set (22 h 70°)% | 40 |  |  |  |

TABLE 2

Finely ground 15 micron Biolignin™, specific surface area 1.56 m$^2$/g
15 micron Biolignin™

|  |  |  |  |  |
|---|---|---|---|---|
| Weight proportion of EPDM | 100 | 100 | 100 | 100 |
| Weight proportion of Biolignin | 0 | 35 | 72 | 35 |
| Weight proportion of carbon black | 100 | 0 | 0 | 0 |
| Density g/cm$^3$ | 1.18 |  |  |  |
| shA hardness | 69 | 61 | 62 | 67 |
| Breaking strength DaN | 10 to 15 | 6.6 | 13.2 | 27.2 |
| Elongation at break Eb mm | 170 to 270 | 139 | 342 | 270 |

Despite the heterogeneity of the Biolignin™/EPDM mixtures, these results show that Biolignin™ can replace carbon black in EPDM-based mixtures, with satisfactory hardness and elongation characteristics.

The increase in the specific surface area provides an improvement of the hardness and of the breaking strength.

The increase in the level of incorporation provides an improvement of the various characteristics.

The results regarding the Biolignin™/carbon black mixture in equal proportions provide results to the reference mixture without Biolignin™.

In the context of the present description, the specific surface area was measured according to the "laser diffraction" method confirmed by nitrogen adsorption ("BET" method).

See, for example:

http://www.malvern.com/LabEng/technology/laser_diffraction/gas_adsorption_bet.htm The molecular weight was determined according to the "SEC" ("size exclusion chromatography") method, eluent THF, "refractometry" detection, three columns in series, 100, 500 and 1000 Angstroms in SDVB (styrene divinyl benzene) at 30° C. This conventional method has been described in all the "Biolignin™" or else "CIMV lignin" publications.

See also, for example:

http://www.malvern.com/labeng/technology/size-exclusion-chromatography.tm, or https://en.wikipedia.org/wiki/Size-exclusion_chromatography

The invention claimed is:

1. A method for the mechanical reinforcement of elastomer polymers, comprising mixing with an elastomer polymer a chemically unmodified lignin with available functional groups which has a specific surface area of between 0.5 m$^2$/g and 5 m$^2$/g, wherein said lignin has a low molecular weight and the Mw of which is between 700 g/mol and 2000 g/mol, and wherein said lignin has a polydispersity index equal to approximately 1.3.

2. The method as claimed in claim 1, wherein said lignin comprises available functional groups chosen from the group made up of aliphatic hydroxyls, phenolic hydroxyls and carboxylic acids.

3. The method as claimed in claim 2, wherein:
   the aliphatic hydroxyls are present at from 1.5 mmol/g to 3.0 mmol/g;
   or the phenolic hydroxyls are present at from 1.1 mmol/g to 2.0 mmol/g;
   or the carboxylic acids are present at from 0.5 mmol/g to 1.5 mmol/g.

4. The method as claimed in claim 1, wherein in that said lignin has a weighted average particle diameter of between 5 microns and 100 microns.

5. An elastomer which incorporates a lignin, wherein said lignin is a chemically unmodified lignin with available functional groups which has a specific surface area of between 0.5 $m^2/g$ and 5 $m^2/g$,
   wherein said lignin has a low molecular weight and the Mw of which is between 700 g/mol and 2000 g/mol.

6. The elastomer as claimed in claim 5, wherein the elastomer does not comprise carbon black.

7. The elastomer as claimed in claim 5, wherein said lignin has a polydispersity index equal to approximately 1.3.

8. The elastomer as claimed in claim 5, wherein said lignin comprises available functional groups chosen from the group made up of aliphatic hydroxyls, phenolic hydroxyls and carboxylic acids.

9. The elastomer as claimed in claim 8, wherein:
   the aliphatic hydroxyls are present at from 1.5 mmol/g to 3.0 mmol/g;
   or the phenolic hydroxyls are present at from 1.1 mmol/g to 2.0 mmol/g;
   or the carboxylic acids are present at from 0.5 mmol/g to 1.5 mmol/g.

10. The elastomer as claimed in claim 5, wherein said lignin has a weighted average particle diameter of between 5 microns and 100 microns.

11. The method as claimed in claim 1, wherein the specific surface area is between 1 $m^2/g$ and 2.5 $m^2/g$.

12. The method as claimed in claim 2, wherein:
    the aliphatic hydroxyls are present at 2.3 mmol/g;
    or the phenolic hydroxyls are present at not less than 1.1 mmol/g;
    or the carboxylic acids are present at approximately 1.0 mmol/g.

13. The method as claimed in claim 1, wherein in that said lignin has a weighted average particle diameter of between 10 microns and 15 microns.

14. The elastomer as claimed in claim 8, wherein:
    the aliphatic hydroxyls are present at from 1.5 mmol/g to 3.0 mmol/g;
    or the phenolic hydroxyls are present at not less than 1.1 mmol/g;
    or the carboxylic acids are present at approximately 1.0 mmol/g.

15. The elastomer as claimed in claim 5, wherein said lignin has a weighted average particle diameter of between 10 microns and 15 microns.

16. A method for the mechanical reinforcement of elastomer polymers, comprising:
    mixing with an elastomer polymer a chemically unmodified lignin with available functional groups which has a specific surface area of between 0.5 $m^2/g$ and 5 $m^2/g$, wherein
    said lignin has a Mw between 700 g/mol and 2000 g/mol, and
    said lignin has a polydispersity index equal to approximately 1.3.

* * * * *